(12) United States Patent
Lin

(10) Patent No.: US 8,819,443 B2
(45) Date of Patent: Aug. 26, 2014

(54) METHODS AND DEVICES FOR AUTHENTICATION AND DATA ENCRYPTION

(75) Inventor: James S. Lin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 33 days.

(21) Appl. No.: 13/396,546

(22) Filed: Feb. 14, 2012

(65) Prior Publication Data

US 2013/0212401 A1    Aug. 15, 2013

(51) Int. Cl.
| G06F 21/00 | (2013.01) |
| G06F 21/31 | (2013.01) |
| G06F 21/10 | (2013.01) |
| G06F 21/44 | (2013.01) |

(52) U.S. Cl.
CPC ............. *G06F 21/31* (2013.01); *G06F 21/10* (2013.01); *G06F 21/44* (2013.01)
USPC ........................... 713/182; 713/183; 713/184

(58) Field of Classification Search
CPC .......... G06F 21/31; G06F 21/10; G06F 21/44
USPC .................................................. 713/180–186
See application file for complete search history.

(56) References Cited

U.S. PATENT DOCUMENTS

| 5,027,396 | A | 6/1991 | Platteter et al. |
| 6,735,693 | B1 | 5/2004 | Hamlin |
| 6,851,063 | B1 | 2/2005 | Boyle et al. |
| 7,003,674 | B1 | 2/2006 | Hamlin |
| 7,155,616 | B1 | 12/2006 | Hamlin |
| 7,913,295 | B2 | 3/2011 | Myers et al. |
| 2003/0070083 | A1 | 4/2003 | Nessler |
| 2004/0172535 | A1* | 9/2004 | Jakobsson et al. ............ 713/168 |
| 2006/0242415 | A1* | 10/2006 | Gaylor .......................... 713/176 |
| 2009/0055655 | A1* | 2/2009 | Ziv et al. ....................... 713/184 |
| 2009/0097657 | A1 | 4/2009 | Scheidt et al. |
| 2009/0328196 | A1 | 12/2009 | Bovee |
| 2010/0031061 | A1* | 2/2010 | Watanabe et al. ............ 713/193 |
| 2010/0058054 | A1 | 3/2010 | Irvine |
| 2010/0185825 | A1 | 7/2010 | Abzarian et al. |
| 2010/0239087 | A1* | 9/2010 | Chaisson et al. ................ 380/44 |
| 2012/0089848 | A1* | 4/2012 | Ziv et al. ....................... 713/183 |

OTHER PUBLICATIONS

Bovee, et al., Microsoft Windows DriverDeveloper Conference 2008, 28 pages.
Kiran Bangalore, "Enhanced Storage", Microsoft WinHEC 2008 Advancing the Platform, 51 pages.
web page: http://msdn.microsoft.com/en-us/library/windows/hardware/ff550139(v=vs.85).aspx (downloaded on Aug. 6, 2013).

* cited by examiner

*Primary Examiner* — Chau Le
*Assistant Examiner* — Don Zhao

(57) ABSTRACT

A storage device comprises a non-volatile storage media and a processor that is operative to receive, via an interface with one or more host devices, a first entered password needed for accessing data stored in the non-volatile storage media, generate a first number, combine the first entered password and the first number, generate a cryptographic key based on the combination of the first entered password and the first number, encrypt the received first entered password using the cryptographic key, and store the encrypted first entered password and the first number in the non-volatile media. The processor may be further operative to receive a request for authentication; provide a reply comprising the first number; receive a second number calculated based on a cryptographic combination of the first number and a second entered password, and authenticate the host device if the second number successfully decrypts the encrypted first entered password.

31 Claims, 3 Drawing Sheets

METHODS AND DEVICES FOR AUTHENTICATION AND DATA ENCRYPTION

BACKGROUND

Microsoft's IEEE 1667 Password Silo authentication protocol requires both the host that wishes to access data stored on a device and the device to prove to each other that it knows the password being authenticated. According to the 1667 protocol, this is done by having each party provide a random challenge to the other, and then returning a hash of the other party's challenge combined with the password. In order for the device to verify that the host knows the correct password, the device itself must also know and store a copy of the password. This is a reasonable condition for most unencrypted products: since the user's data is not encrypted, the device may store its copy of the password in non-volatile memory that is only a little more secure than the user's data.

However, passwords for data encryption products must be secured at least as well as the data encryption key (DEK) and the encrypted data itself. If the product is designed so the access credentials reside solely with the user, then the device itself must not contain any passwords or keys that can be used to access the user's data. Indeed, a thief should not be able to disassemble and analyze the device and discover the necessary information that would enable him or her to decrypt the stored encrypted data. Moreover, an interloper listening in between the host and the device should not be able to capture any information exchanged between the host and the device that would allow him or her to later become authenticated by the device and decrypt the encrypted data stored by the device.

DETAILED DESCRIPTION

Figure 1:
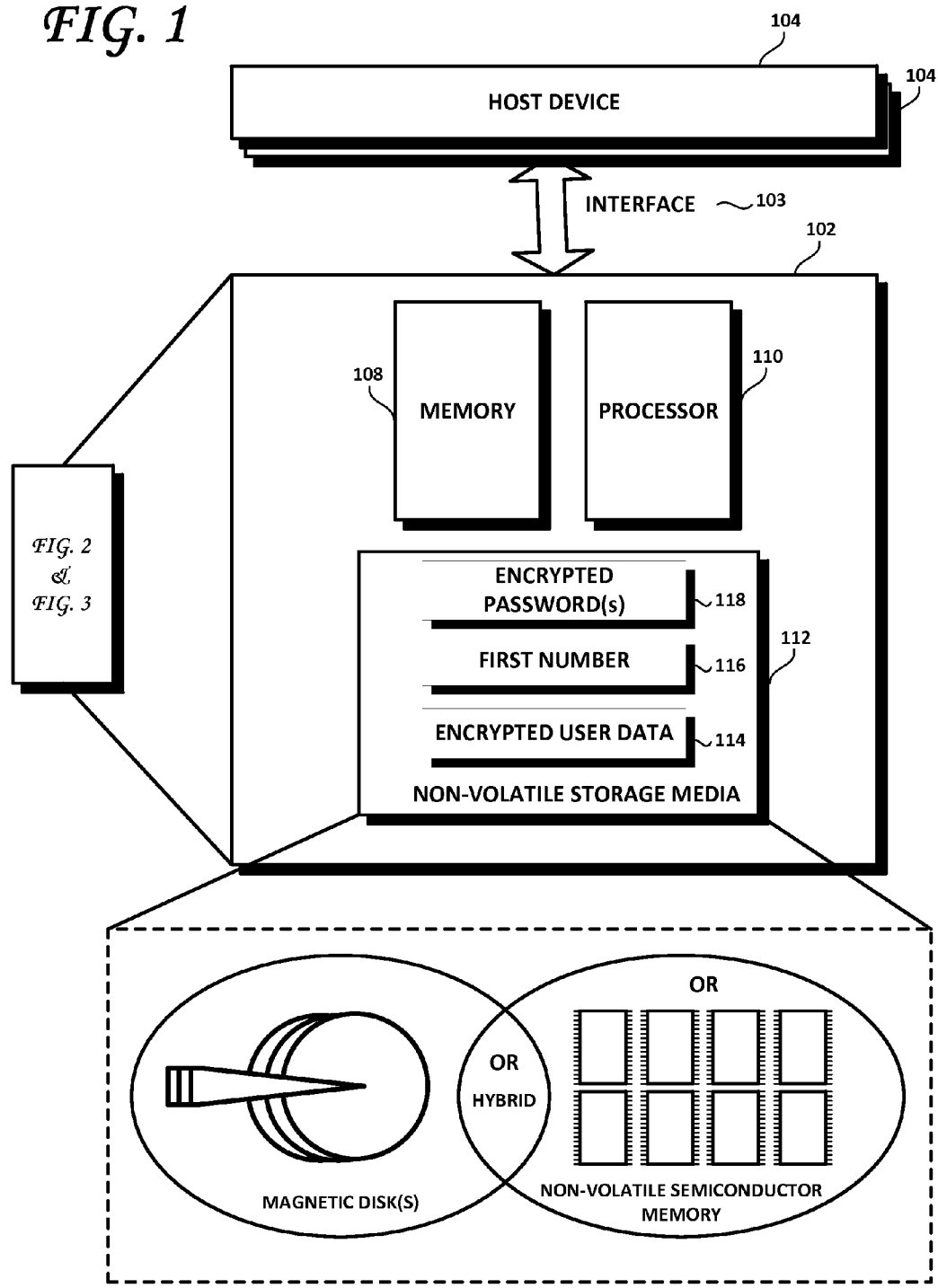
FIG. 1 is a block diagram of a host device and a storage device configured according to one embodiment.

FIG. 1 is a block diagram of a host device and a storage device configured according to one embodiment. As shown therein, a storage device 102 may be coupled to one or more host devices 104 via an interface 103. In some embodiments, there may be more than one host device 104 coupled to the storage device 102. The host device(s) 104 may be or include a personal computer, a tablet or any device that requests access to the encrypted data stored within the storage device 102 such as, for example, a Digital Video Recorder (DVR), a DNLA television or a wireless device. The storage device 102 may include non-volatile storage media 112 such as, for example, a magnetic disk or disks, a non-volatile semiconductor memory (such as a Flash drive or a SSD), a hybrid containing both a magnetic disk or disks and non-volatile semiconductor memory, or any other device capable of storing user data in a non-volatile manner. The storage device 102 may also include volatile memory 108 (e.g., Random Access Memory (RAM)) and a processor 110. The processor may be any combination of hardware, software and/or firmware that together execute the methods in FIGS. 2 and 3. The non-volatile storage media 112 may store at least encrypted user data 114, one or more encrypted user passwords 118 and a first number 116, as described hereunder. The non-volatile storage media 112 may also, as developed hereunder, store one or more DEKs. The processor 110 may be operative to carry out the methods shown in FIGS. 2 and 3, as also described hereunder.

Figure 2:
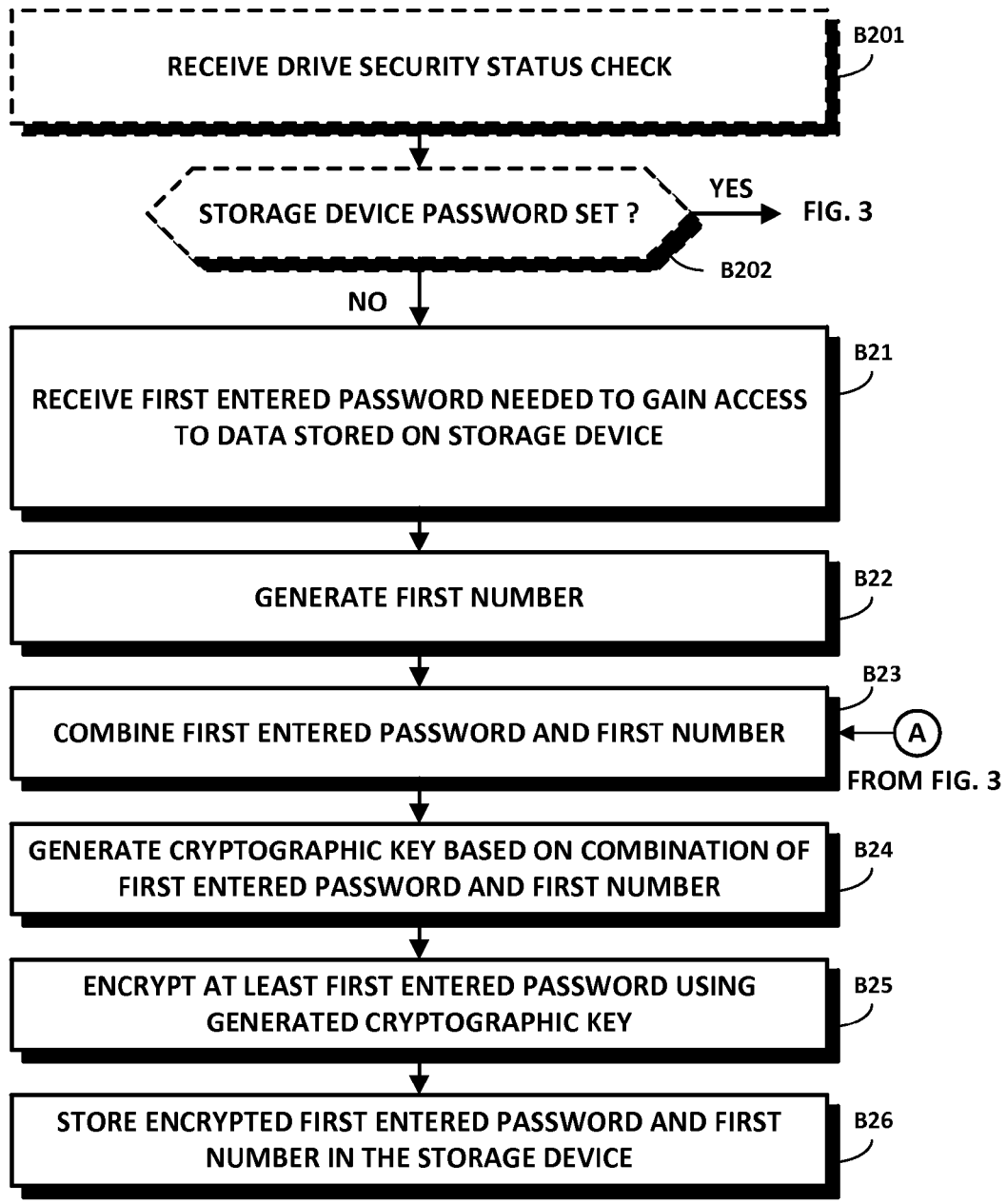
FIG. 2 is a flowchart of a method of securing a password for accessing data stored on a storage device, according to one embodiment.

FIG. 2 is a flowchart of a method securing a password for accessing data storage on a storage device, according to one embodiment. Blocks B201 and B202 may optionally be carried out and are included herewith for completeness. Block B201 calls for the storage device 102 to receive a drive security status check from the host device 104. Such a status check may determine whether the password for the storage device 102 has been set. If the password to the storage device 102 has previously been set, (YES branch of block B202), the method may proceed to block B31 of FIG. 3. If, however, the password to the storage device 102 has not been set (NO branch of block B202), the method may proceed to block B21 of FIG. 2. As shown therein, block B21 calls for the storage device 102 to receive a first entered password needed to gain future access to data stored on the storage device 102. This first entered password may be received from host device 104 via interface 103, as shown in FIG. 1. The first entered password may have been entered by a user of the host device 104, and sent to the storage device in the clear (i.e., not encrypted). Alternatively, the first entered password received by the storage device 102 may have been previously stored on the host device 104.

Responsive to the receipt, by the storage device 102, of the first entered password, the storage device 102 may generate a first number, as shown at block B22. The generated first number may comprise a random number or a pseudo-random number. The storage device 102 may then combine the received first entered password and the generated first number, as shown at block B23. As called for by block B24, a cryptographic key based on the combination of the first entered password and the first number may then be generated. The received first entered password (and, optionally, other data structures) may then be encrypted using the generated cryptographic key, as shown at block B25. Then, as shown at block B26, at least the encrypted first entered password and the first number may be stored in the non-volatile storage media 112.

According to one embodiment, the first entered password sent to the storage device 102 in the clear (and received by the storage device 102 at block B21) is only temporarily stored in volatile memory 108 and not stored in the non-volatile storage media 112.

The cryptographic key may be generated based on the combination of the first entered password and the first number. According to one embodiment, the first entered password and the first number may be combined by appending (e.g., concatenating) the first entered password to the first number or by appending (e.g., concatenating) the first number to the first entered password. According to one embodiment, the first entered password and the first number may be combined by hashing the first entered password and the first number. Most any secure hashing algorithm may be used to combine the first entered password and the first number. For example, the SHA-1 ("secure hash algorithm 1") cryptographic hash function may be used to combine the first entered password and the first number. SHA-1 was designed by the United States National Security Agency (NSA) and published by the United States NIST as a U.S. Federal Information Processing Standard. Another example of a suitable hashing algorithm is SHA-2, which is a set of cryptographic hash functions (SHA-224, SHA-256, SHA-384, SHA-512) also designed by the NSA and published in 2001 by the NIST. SHA-2 is thought to include a significant number of changes from its predecessor, SHA-1. At the present time, SHA-2 consists of a set of four hash functions with digests that are 224, 256, 384 or 512 bits in length. Other hash algorithms may be used to combine the first entered password and the first number, as those of skill may recognize. According to one embodiment, combining the first entered password and the first number may include appending the first entered password to the first number (or appending the first number to the first entered password) and hashing the resultant first entered password and appended first number using the SHA-1 and/or SHA-2 hashing algorithms to generate the cryptographic key or keys. The thus generated cryptographic key or keys may then be used to encrypt the first entered password (thereby generating a first encrypted first entered password) and the DEK used to encrypt user data on the storage device 102. The first encrypted first entered password(s) and encrypted DEK(s) may then be stored in the non-volatile storage media 112.

According to one embodiment, there may be more than one first entered password. For example, the storage device 102 may support use of both a user password and an administrator (admin) password. As noted above, the storage device 102 may also support use of more than one hash algorithm. For example, the storage device 102 may also support the use of both the SHA-1 and one or more hash functions selected from the set of hash functions defined by the SHA-2 protocol such as, for example, SHA-256. Therefore, according to one embodiment, to support both a user password and an admin password and the use of SHA-1 and SHA-2, a total of four separate cryptographic keys may be generated. The first such cryptographic key may be a SHA-1 hash of the first entered user password appended to the first number or a SHA-1 hash of the first number appended to the first user entered password. The second such cryptographic key may be a SHA-1 hash of the first entered admin password appended to the first number or a SHA-1 hash of the first number appended to the first admin entered password. The third such cryptographic key may be a SHA-2 hash of the first entered user password appended to the first number or a SHA-2 hash of the first number appended to the first user entered password. Finally, the fourth such cryptographic key may be a SHA-2 hash of the first entered admin password appended to the first number or a SHA-2 hash of the first number appended to the first admin entered password. It is understood, however, that most any string operation, mathematical operation or logical operation may, singly or in combination, be substituted for the term "appended" and/or "combined", as those of skill in this art may recognize.

Continuing with the example developed immediately above, the first cryptographic key (generated using SHA-1) may then be used to encrypt the first entered user password and the DEK, the second cryptographic key (also generated using SHA-1) may then be used to encrypt the first entered admin password and the DEK, the third cryptographic key (generated using SHA-2) may be used to encrypt the first entered user password and the DEK and the fourth cryptographic key (generated using SHA-2) may be used to encrypt the first entered admin password and the DEK.

Once the method outline in FIG. 2 and described above has been carried out, the storage device 102 only stores an encrypted version (if one hash is used) or versions (if more than one hash is used) of the first entered user password. If an admin password is used, the storage device 102, in addition to the encrypted version(s) of the first entered user password, stores an encrypted version (if one hash is used) or versions (if more than one hash is used) of the first entered admin password. The user and admin passwords are not stored in the clear on the storage device 102. In this manner, should the storage device 102 come into the possession of a non-authorized user, such non-authorized user could not disassemble and analyze the drive in an attempt to recover the user and/or admin passwords, to access the encrypted user data stored on the storage device 102.

Figure 3:
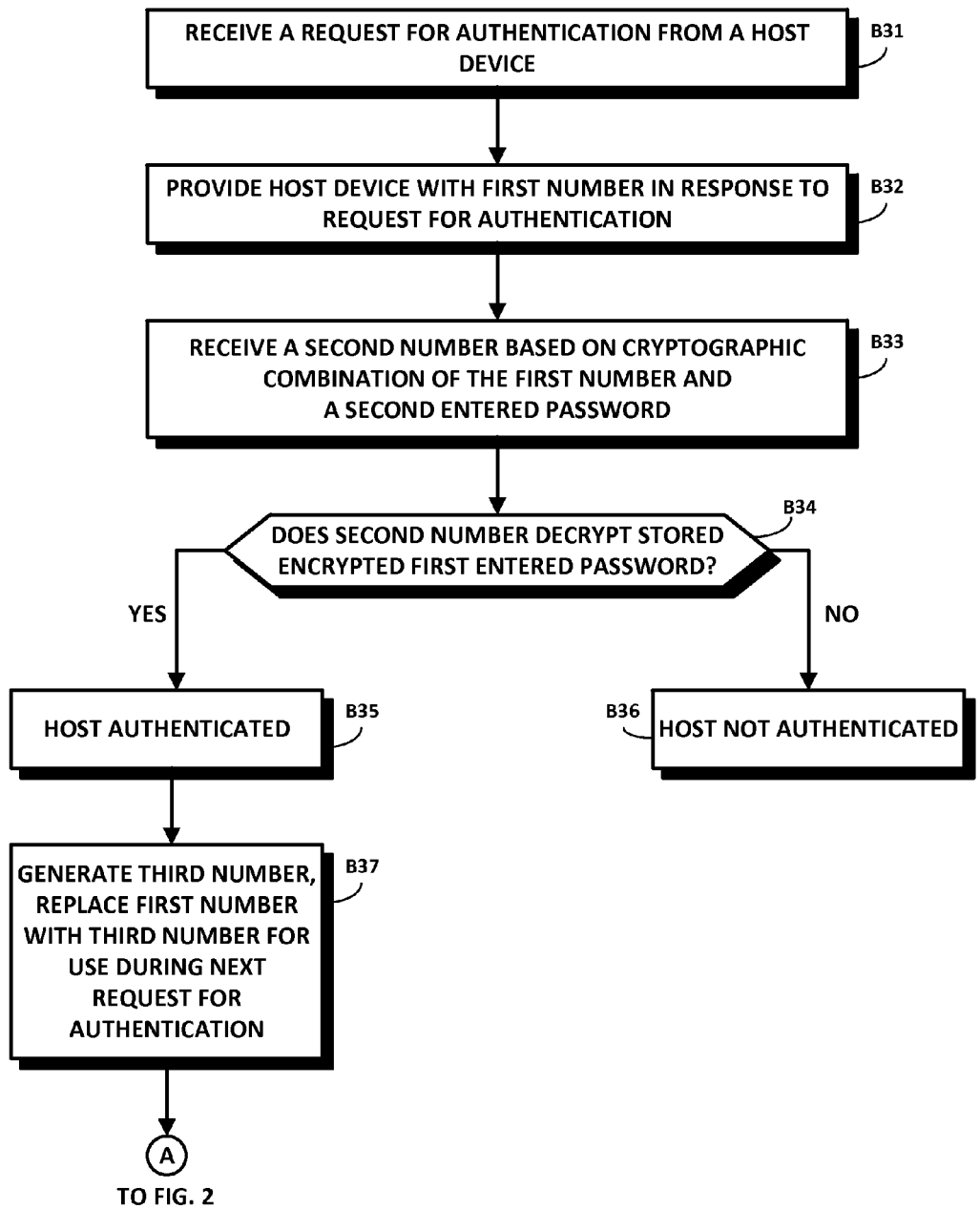
FIG. 3 is a flowchart of a method of authenticating a host device, according to one embodiment.

Once the passwords are set and stored, in encrypted form, on the storage device 102, the storage device 102 is ready to authenticate a host device (and, by extension, the user thereof) seeking access to the encrypted user data stored on the non-volatile storage media 112. FIG. 3 is a flowchart of a method of authenticating a host device, according to one embodiment. As shown therein, block B31 calls for the storage device 102 receiving, via the interface 103 with the host device 104, a request for authentication. The host device 104 may have requested, and the user provided, a second entered password, which is a password that is entered by the user of the host device 104 when the storage device 102 requests authentication from the host device 104. The phrase "second entered password" is intended to distinguish the password entered during an authentications session from the "first entered password", which is entered by the user during a password setting or re-setting session. Having received the request for authentication from the host device 104, the storage device 102 may respond to the request by replying to the host device 104 with a first number, as shown at B32. According to one embodiment, the first number may comprise a random number previously generated by or provided to the processor 110 and stored in the non-volatile storage media 112. Block B33 calls for the storage device 102 to then receive a second number that is based on a cryptographic combination of the first number provided to the host device at block B32 and the second entered password.

The storage device 102 may then read the encrypted first entered password (also called the first encrypted first entered password herein) from its storage media 112, and attempt to decrypt the first encrypted first entered password using the second number. If the second number successfully decrypts the first encrypted first entered password (YES branch of block B34), the host device 104 is successfully authenticated, as shown at block B35. After the host has been authenticated, a new password may be received and encrypted (according to blocks B21-B26 of FIG. 2) if the user elects to change passwords. If the second number does not successfully decrypt the first encrypted first entered password (NO branch of block B34), the host device 104 is not authenticated, as shown at block B36. If not authenticated, the host device 104 may be disallowed access to the user data stored on the non-volatile storage media 112 of the storage device 102. The determination of the success or failure of the decryption may be determined in many ways. For example, to determine whether the decryption of the first encrypted first entered password is successful, a previously known number (e.g., a predetermined 32 bit number whose value may be set in firmware) may have been encrypted together with the first entered password and stored on the non-volatile storage media 112. Thereafter, upon decrypting that previously encrypted number together with the first encrypted first entered password, a determination may be made whether the decrypted number matches the value set in firmware. If so, the decryption of the first encrypted first entered password may be deemed to have been successful. If the decrypted number does not match the value set in firmware, the decryption of the first encrypted first entered password may be considered to have been unsuccessful. Alternatively, a Cyclic Redundancy Check (CRC) of the first entered password may be determined. The CRC may then be encrypted together with the first entered password and stored on the non-volatile storage media 112. Upon decryption of the first encrypted first entered password, the CRC may also be decrypted and compared with a CRC of the just-decrypted first encrypted first entered password. If the CRC of the just-decrypted first encrypted first entered password matches the decrypted CRC, the decryption of the first encrypted first entered password may be deemed to have been successful. If the CRC of the just-decrypted first encrypted first entered password does not match the decrypted CRC, the decryption of the first encrypted first entered password may be considered to have been unsuccessful. Those of skill in this art may recognize that other methodologies of determining the success or failure of the decryption of the first encrypted first entered password are possible.

Upon successful authentication, the processor 110 of the storage device 102 may cause a first message to be generated and provided to the host device 104, the first message indicating that the host device 104 has been successfully authenticated by the storage device 102. Upon an unsuccessful authentication attempt, the processor 110 of the storage device 102 may cause a second message to be generated and provided to the host device 104, the second message indicating that the host device 104 has not been successfully authenticated by the storage device 102. In that case, the storage device 102 would deny the host device 104 access to the encrypted user data 114 stored therein.

According to one embodiment, the cryptographic key generated based on the combination of the first entered password and the first number is used to encrypt not only the first entered password but the DEK as well. If the authentication is successful and the host authenticated, as shown at B35, not only may the first entered password be decrypted, but the DEK may be successfully decrypted as well. This successful decryption of the DEK enables the encrypted user data 114 to be decrypted and accessed by the host device 104 in the clear. If, however, the authentication fails, as shown at B36, neither the first entered password nor the DEK may be successfully decrypted. If not decrypted, the DEK is unavailable to decrypt the DEK-encrypted user data stored on the non-volatile storage media 112. In turn, this entails that the host device may not access any of the encrypted user data 114 in the clear.

After the host device 104 is successfully authenticated at block B35, the storage device may generate a third number, which third number replaces the first number and is stored in the non-volatile storage media 112. The third number, according to one embodiment, takes the place of the first number 116 and may be considered to be a "new" first number. The aforementioned replacements having been carried out, the method may then revert back to block B23 of FIG. 2 to prepare for the next request for authentication, as show at "A" in FIGS. 2 and 3.

At block B23, the storage device 102 may combine the first entered password (the decrypted first encrypted first entered password from the just-successful authentication) and the first number (the third number from the just-successful authentication) and generates a cryptographic key based on the resulting combination, as shown at block B24. Thereafter, the first entered password (the decrypted first encrypted first entered password from the just-successful authentication) may be encrypted using the generated cryptographic key, as show at B25, to generate a second encrypted first entered password. The DEK may also be encrypted using the generated cryptographic key. The thus re-encrypted first entered password (the second encrypted first entered password), the third number and the encrypted DEK may then be stored in the non-volatile storage media 112 of the storage device 102, as shown at B26.

Thereafter, when the host device 104 next requests authentication, the decryption of the re-encrypted first entered password and DEK will be carried out using the third number generated at block B37, which third number is, in effect, the "new" first number that was used to encrypt the first entered password and the DEK. Indeed, the next time the storage device receives a request for authentication from the host device 104, the storage device provides the host device 104 with the most recently generated third number, which third number replaces the first number. It is with this third number (the "new" first number) that the host device 104 generates a new cryptographic key that is different from the cryptographic key generated in preparation for the previous authentication attempt. Therefore, a third number (the "new" first number) may be stored in the non-volatile storage media 112.

The generation of a new cryptographic key and subsequent encryption of the first entered password and DEK using the new cryptographic key ensures that an interloper, observing traffic between the host device 104 and the storage device (such as with a signal analyzer, for example), would not be able to intercept any information that would enable him or her to generate the second number that is used to decrypt the encrypted first entered password and the DEK, even if such interloper were to successfully intercept and interpret all of the signals exchanged during an authentication session. This is because blocks B23 to B26 may be carried out entirely internally to the storage device 102, immediately after a successful authentication. Such an interloper, therefore, would have no knowledge of the "new" first number (the third number generated at block B37 in FIG. 3), from which the cryptographic key is generated and which is communicated to the host device 104 only upon the storage device receiving the next subsequent request for authentication.

According to one embodiment, to support the case in which the storage device supports a plurality of first entered passwords and a plurality of hash algorithms to encrypt the plurality of first entered passwords and the DEK, when the storage device 102 receives the request for authentication at block B31 in FIG. 3, the storage device may also concurrently receive a password indicator (e.g., 0x00 for the first entered admin password and 0x01 for the first entered user password) and a hash algorithm indicator (e.g., 0x00 for the SHA-1 hash algorithm and 0x01 for the SHA-256 has algorithm) from the host device 104. The receipt of the password indicator and the hash algorithm indicator from the host device 104 allows the storage device 102 to determine which of the sets of encrypted first entered passwords and DEKs is to be attempted to be decrypted in block B34 with the second number provided by the host device in block B33.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures may differ from those shown in the figures. Depending on the embodiment, certain of the steps described in the example above may be removed, others may be added.

Also, the features and attributes of the specific embodiments disclosed above may be combined in different ways to form additional embodiments, all of which fall within the scope of the present disclosure. For example, the storage device 102 may support any number of first entered passwords and hash algorithms. Although the present disclosure provides certain preferred embodiments and applications, other embodiments that may become apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A storage device configured to secure a password and to authenticate a host device, comprising:
   a non-volatile storage media;
   an interface coupled to at least one host device; and
   a processor, the processor being operative to:
      receive, via the interface with the at least one host device, a first entered password needed for accessing data stored in the non-volatile storage media;
      generate a first number;
      combine the first entered password and the first number;
      generate a cryptographic key based on the combination of the first entered password and the first number;
      encrypt the received first entered password using the cryptographic key:
      store the encrypted first entered password and the first number in the non-volatile media;
      receive, via the interface, a request for authentication;
      responsive to the received request for authentication, provide to the at least one host device, via the interface, a reply comprising the first number with which the cryptographic key was generated:
      receive, via the interface, a second number calculated by the at least one host device, the second number being based on a cryptographic combination of the first number provided to the at least one host device and a second entered password; and
      authenticate the at least one host device if the second number successfully decrypts the encrypted first entered password.

2. The storage device of claim 1, wherein the processor is further operative to generate a random number as the first number.

3. The storage device of claim 1, wherein the processor is further operative to encrypt user data to be stored on the non-volatile storage media.

4. The storage device of claim 1, wherein the processor is further operative to combine the first entered password and the first number by one of appending the first entered password to the first number and appending the first number to the first entered password.

5. The storage device of claim 1, wherein the processor is further operative to combine the first entered password and the first number by hashing the first entered password and the first number.

6. The storage device of claim 1, further comprising not authenticating a first host device if the second number does not successfully decrypt the encrypted first entered password.

7. The storage device of claim 1, wherein the processor is further operative to encrypt a data encryption key (DEK) used to encrypt user data on the storage device, using the cryptographic key.

8. The storage device of claim 7, wherein the processor is further configured to decrypt the encrypted DEK using the second number.

9. The storage device of claim 1, wherein the non-volatile storage media comprises a disk and the storage device further comprises a head for writing data to the disk and for reading data from the disk.

10. Tire storage device of claim 1, wherein the non-volatile storage media comprises a non-volatile semiconductor memory.

11. A storage device configured to authenticate a host device, comprising:
    a non-volatile storage media;
    an interface coupled to the at least one host device; and
    a processor, the processor being operative to:
       receive, via an interface with the at least one host device, a request for authentication;
       read, from the non-volatile storage media, a first number;
       responsive to the received request for authentication, provide to the at least one host device, via the interface, a reply comprising the first number with which a cryptographic key was generated;
       receive, via the interface, a second number calculated by the at least one host device, the second number being calculated based on a cryptographic combination of the first number provided to the at least one host device and a second entered password;
       read, from the storage device, a first encrypted first entered password that has been encrypted with a cryptographic combination of a first entered password and the first number; and
       authenticate the at least one host device if the second number successfully decrypts the first encrypted first entered password.

12. The storage device of claim 11, wherein the processor is further operative to not authenticate the at least one host device if the second number does not successfully decrypt the first encrypted first entered password.

13. The storage device of claim 11, wherein the processor is farther operative to:
    generate a third number and to replace the first number with the third number in the storage device when the at least one host device is successfully authenticated;
    generating a second encrypted first entered password based on a cryptographic combination of the first entered password and the third number; and
    storing the second encrypted first entered password in the non-volatile storage media.

14. The storage device of claim 13, wherein the processor is further operative to generate a random number as the third number.

15. The storage device of claim 11, wherein the second number comprises a hash, calculated by the at least one host device, of the first number and the second entered password.

16. The storage device of claim 11, wherein the processor is further operative to provide, via the interface, a message indicating that the at least one host device has been authenticated by the storage device.

17. The storage device of claim 11, wherein the non-volatile storage media comprises a disk and the storage device further comprises a head for writing data to the disk and for reading data from the disk.

18. The storage device of claim 11, wherein the non-volatile storage media comprises a non-volatile semiconductor memory.

19. A method for a storage device to secure a password and authenticate a host device, the method comprising:
- receiving, via, an interface with at least one host device, a first entered password needed for accessing data stored on the storage device;
- generating a first number;
- combining the first entered password and the first number;
- determining a cryptographic key based on the combination of the first entered password and the first number;
- encrypting at least the first entered password using the cryptographic key;
- storing the encrypted first entered password and the first number in the storage device;
- receiving, via the interface, a request for authentication;
- reading, from the storage device, a first number;
- responsive to the received request for authentication, providing to the at least one host device, via the interface, a reply comprising the first number with which the cryptographic key was generated;
- receiving, via the interface, a second number calculated by the at least one host device, the second number being calculated based on a cryptographic combination of the first number provided to the at least one host device and a second entered password;
- reading the encrypted first entered password from the storage device; and
- authenticating the at least one host device if the second number successfully decrypts the encrypted first entered password.

20. The method of claim 19, wherein generating a first number comprises generating a random number.

21. The method of claim 19, wherein combining the first entered password and the first number comprises one of appending the first entered password to the first number and appending the first number to the first entered password.

22. The method of claim 19, wherein combining the first entered password and the first number comprises hashing the first entered password and the first number.

23. The method of claim 19, further comprising encrypting, using the cryptographic key, a data encryption key (DEK) used to encrypt data stored on the storage device.

24. The method of claim 19, wherein storing the encrypted first entered password comprises storing the encrypted first entered password in a non-volatile media in the storage device.

25. The method of claim 19, further comprising storing the first number in a non-volatile media in the storage device.

26. A method for a storage device to authenticate a host device, comprising:
- receiving, via an interface with the at least one host device, a request for authentication;
- reading, from the storage device, a first number;
- responsive to the received request for authentication, providing to the at least one host device, via the interface, a reply comprising the first number with which a cryptographic key was generated;
- receiving, via the interface, a second number calculated by the at least one host device, the second number being calculated based on a cryptographic combination of the first number provided to the at least one host device and a second entered password;
- reading, from the storage device, a first encrypted first entered password based on a cryptographic combination of a first entered password and the first number; and
- authenticating the at least one host device if the second number successfully decrypts the first encrypted first entered password.

27. The method of claim 26, further comprising not authenticating the at least one host device if the second number does not successfully decrypt the first encrypted first entered password.

28. The method of claim 26, further comprising;
- generating a third number and replacing the first number with the third number in the storage device when the at least one host device is successfully authenticated, and
- generating a second encrypted first entered password based on a cryptographic combination of the first entered password and the third number, and
- storing the second encrypted first entered password in the storage device.

29. The method of claim 28, wherein generating the third number comprises generating a random number.

30. The method of claim 26, wherein receiving the second number comprises receiving a hash, calculated by the at least one host device, of the first number and the second entered password.

31. The method of claim 26, further comprising providing, via the interface, a message indicating that the at least one host device has been authenticated by the storage device.

* * * * *